March 24, 1936.          E. C. PIOCH                    2,034,831
                      GREASE RETAINER
                    Filed Aug. 29, 1933

INVENTOR.
Emil C. Pioch
BY
ATTORNEY.

Patented Mar. 24, 1936

2,034,831

UNITED STATES PATENT OFFICE 2,034,831

GREASE RETAINER

Emil C. Pioch, Detroit, Mich.

Application August 29, 1933, Serial No. 687,305

3 Claims. (Cl. 288—1)

The object of my invention is to provide a grease retainer of simple, durable, and inexpensive construction.

Still a further object of my invention is to provide a grease retainer comprising a housing member, a leather grease retaining ring, and a resilient member for forcing the grease retainer into contact with a shaft.

Still a further object of my invention is to provide a grease retainer comprising a two piece sheet metal housing having a leather grease retaining ring therein and a ring of resilient material having a substantially annular portion adapted to secure the leather in the housing and a plurality of spring fingers formed integrally therewith and extending inwardly therefrom to resiliently urge the adjacent portion of the leather into contact with a shaft.

Still a further object of my invention is to provide a ring of resilient material in connection with such a construction provided with a substantially annular outer flange and an intermediate channel shaped portion and a plurality of spring fingers extending inwardly therefrom whereby said spring may locate the leather in the grease retainer housing and the spring fingers thereon may force the leather into contact with a shaft.

Still a further object of my invention is to provide a grease retainer comprising a sheet metal housing member of angular section and a second sheet metal housing member of similar section whereby these two members together may form an annular housing of substantially rectangular section having a space between two of their flanges at the inner side thereof so that an annular spring ring and a leather ring may be received in this space and extended inwardly therefrom so that the housing may locate the leather and ring and cause the ring to resiliently urge the leather into contact with a shaft.

Still a further object of my invention is to provide a grease retainer of the character described having a two piece sheet metal housing composed of two sheet metal annular rings and of angular cross section adapted to fit together to form a housing of substantially rectangular cross section with a space between the inner flanges of the housing to receive the leather and the spring ring which forces the leather into contact with the shaft and locates the leather.

Still a further object of my invention is to provide a grease retainer having a sheet metal housing therefor of substantially rectangular cross section having a grease retainer and a sheet metal resilient ring for forcing the grease retainer into contact with the shaft which is so arranged that assembly of the housing members will locate the ring and the ring will locate the grease retainer and at the same time resiliently urge it into contact with the shaft.

With these and other objects in view, my invention consists in the arrangement, combination, and construction of the various parts of my improved device as described in the accompanying specification, claimed in the claims, and illustrated in the accompanying drawing, in which Figure 1 shows a plan view of a grease retainer constructed in accordance with my invention.

Figure 2:
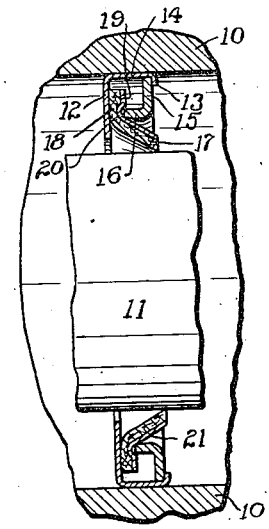
Figure 2 shows a vertical central section review of the grease retainer shown in Figure 1 showing portions of a housing and a shaft in which and around which the retainer is mounted.

Referring to the accompanying drawing, I have used the reference numeral 10 to indicate generally the housing member in which the grease retainer would be installed, such for instance as a rear axle housing for an automobile. Extending through this housing is a shaft 11 such as a rear axle shaft for an automobile. This grease retainer is designed to prevent grease in the housing 10 which in this instance would be to the right of the grease retainer in Figure 2 from working past the grease retainer to the left. These grease retainers are largely used to retain the grease in the rear axle housings of automobiles and in connection with the spindles of front wheels of automobiles.

The retainer housing comprises an annular ring 12 of sheet metal of angular section having a plurality of inwardly extending stop members 13 at one edge of the cylindrical flange and at the other edge of the cylindrical flange a vertical flange. A second member 15 is provided with an annular vertical flange and a cylindrical flange 16 integral therewith. These two members 12 and 15 fit together and together form a housing member of substantially rectangular section which is provided with a space between the flange 16 and the vertical flange of member 12.

Figure 5:
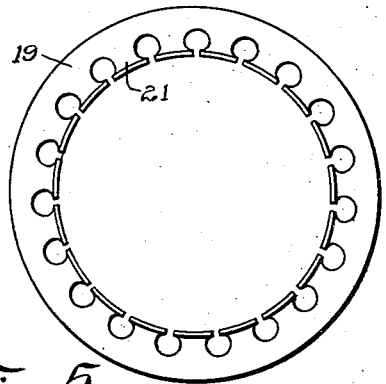
Figure 5 shows a plan view of the resilient ring used in connection with my device for locating the leather and urging it into contact with the shaft.

A leather washer member 17 which is in the form of a ring is provided, this leather having a substantially vertical flat outer portion 18 and an inner portion in the form of a truncated cone. A spring ring 19 of resilient sheet metal such as phosphor bronze or spring steel is provided for the triple purpose of locating the leather, forcing the conical portion thereof into contact with the shaft 11 to form a grease retaining seal therewith, and forcing the flat portion of the leather into oil sealing engagement with the housing. This spring member 19 has an intermediate portion of channel section at 20 between the flat outer portion and the inner portion which is of the shape of a truncated cone and has a plurality of spring fingers stamped out of the metal of the ring. The shape of these fingers 21 is quite clearly shown in Figure 5 and is also shown in the broken away portions in Figure 1. This channel 20 serves multiple functions of locating the ring in the retainer, of holding the leather in fixed position relative to the ring in the housing, of compensating slight variations in dimensions of the housing or leather parts of the retainer, and of forcing the leather into grease sealing contact with the shaft and housing.

Figure 1:
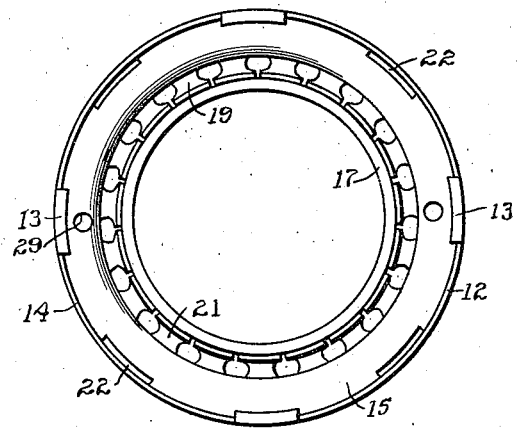
Figure 3:
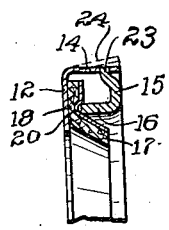
Figure 3 shows a detailed sectional view of an alternate form of the device shown in Figure 2.
Figure 4:
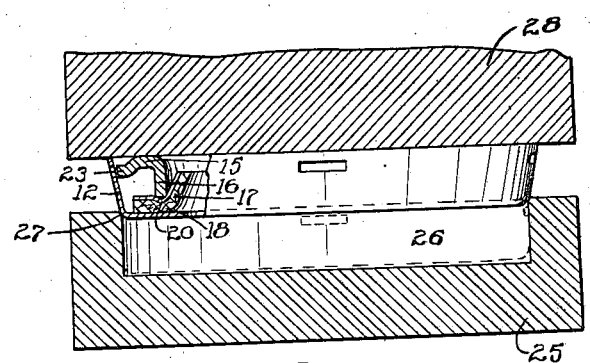
Figure 4 illustrates a method of assembling a grease retainer constructed in the manner illustrated in Figure 3.

In assembling this device it may be assembled as illustrated in Figures 1 and 2 or as illustrated in Figures 3 and 4. In the construction shown in Figures 1 and 2 the cylindrical portion of the housing member 12 is provided at one edge with a plurality of inwardly extending locating stop members 13 and the vertical flange of the housing 15 is provided with a plurality of notches 22 in the outer edge thereof so that when the device is assembled the leather and ring 19 are placed on the vertical flange of the housing member 12 and then the housing member 15 is laid down over these other parts with the stop members 13 coinciding with the notches 22. Pressure is then applied to the housing member 15 to force it toward the housing member 12 thereby forcing the notches 22 past the stops 13 and the inner edge of the cylindrical flange 16 into engagement with the channel 20 in the ring 19 thereby locating the ring relative to the housing and at the same time causing the other side of this channel to embed itself in the leather 17 which prevents axial movement of the leather relative to the ring 19. This same engagement also causes the leather to be yieldingly urged into contact with the vertical flange of member 12 to form a grease retaining seal therewith. When the member 15 is so placed into place, then it may be rotated in any suitable manner, as by the holes 29 in the member 15, to cause the stops 13 to engage the member 15 at some place other than the notches 22 so as to hold the member in its assembled position with the resiliency of the channel 20 in the ring 19 urging the leather 17 into contact with the vertical flange of the member 12 to maintain the grease retaining seal therewith.

When the parts are in this assembled position the device is ready for installation into the place where it is to be used. This is done by causing the housing 10 to have substantially the same dimensions as the periphery of the housing member 12 so that the grease retainer may be forced into the opening in the housing with what is termed "press-fit". This "press-fit" forms an oil sealing engagement between the retainer and the housing 10 the shaft 11 may then be inserted in the housing and the spring fingers 21 of the ring 19 will cause the whole periphery of the inner edge of the conical portion of the leather to be resiliently urged into contact with the surface of the shaft to form a grease sealing contact therewith. It will be seen that although the shaft is eccentric to the housing or the leather, the grease sealing resilient contact will still be maintained due to the resiliency of the fingers 21. In fact, the resiliency of these fingers is such that the grease sealing contact with the shaft will be maintained even though it is slightly bent so that it moves from side to side during its rotation.

In the form of device shown in Figures 3 and 4, the housing members of the retainer are secured together in a more permanent manner by forming the spaced extensions or tongues 23 on the housing member 15. The housing member 12 is initially formed so that the flange 14 thereof will initially taper as indicated by the dotted lines 24 in Figure 3. This flange 14 is also provided with slots of suitable size and suitable spaced so that they will exactly coincide with the surface of the tongues 23 in assembled device. When made in this form, a die member 25 is provided with a recess 26 of exactly the finished size of the housing for the grease retainer. The upper edges of this recess are rounded off at 27 so that the parts may be set in their assembled relation on this rounded off portion as shown in Figure 4 and the plunger 28 may be brought down on the assembly to force the housing member 12 into the recess 26 which swages the flange 14 of the member 12 from its tapered to a true cylindrical form and it causes the tongues 23 to extend through the slots in the flange 14 to positively locate the parts relative to each other.

In this form of device it will be noted that the housing member 15 has the vertical flange thereof of arcuate section so that when the plunger 28 comes down on the assembly it will press against both the housing member 15 and the housing member 12 to force them into the recess 26 in the die 25 in fixed relation to each other so the tongues 23 will be properly placed relative to the slots in the flange 14.

Among the many advantages of my improved device, it may first be suggested that it has fewer parts than any device which is now on the market so far as I know and which accomplishes the same purpose. The resilient ring 19 performs the triple function in assembly of yieldingly urging the leather into contact with the housing to form an oil seal therewith, of urging the leather into contact with the shaft to form an oil seal therewith, and of locating the leather and the ring relative to the housing.

A further advantage results from the simplicity of the sheet metal parts used and the ease with which the device may be assembled. A further advantage results in the use of the device shown in Figures 3 and 4 in that it is impossible for a person without proper tools to dis-assemble the device and substitute a new leather therein. This is particularly important because the quality and construction of the leather ring is highly important to the successful continued use of a device of this character so that this construction enables a manufacturer of the device to insure that a proper leather will be used by those purchasing the grease retainer from him. A further advantage results in the construction shown in Figures 3 and 4 in that no machine operation is needed for the final assembly of the device other than the swaging of the flange 14 from a tapered to a cylindrical form so that accuracy of the parts will not be affected by any machine operations during or following assembly.

Still a further advantage results from the use of the resilient ring 19 for urging the leather into contact with the shaft and with the housing as the pressure in both cases can be very nicely controlled by controlling the resiliency of the material of the ring and at the same time the channel 20 in the ring compensates for any variations normally encountered in the thickness of the leather.

I claim as my invention:

1. A grease retainer comprising a housing formed from two sheet metal rings of angular section locked together to form a housing of substantially rectangular section, the inner wall of the housing being of less width than the outer wall of the housing whereby there may be a space between the inner wall and one side wall of the housing, a ring of pliable material having a flat annular portion and a portion of the shape of a truncated cone extended inwardly from the housing, and a resilient ring, said ring having a flat outer annular flange and a central annular bead and a plurality of spring fingers at its inner edge whereby the inner wall of the housing may engage the ring adjacent to the bead and thereby locate the pliable ring and the resilient ring and urge the pliable ring into grease sealing contact with the housing and whereby the spring fingers may bear against the conical portion of the pliable ring to yieldingly urge it inwardly.

2. A grease retainer comprising a housing having a ring of pliable material therein having a flat annular portion and a portion the shape of a truncated cone extended inwardly from said housing, and a resilient ring, said ring having a flat outer annular flange and a central annular bead and a plurality of spring fingers at its inner edge, the housing and the pliable and resilient rings being so shaped that an annular edge of the housing presses against the bead in the resilient ring to locate the resilient ring and to embed the bead in the resilient ring in the pliable ring whereby the pliable ring is located in the housing and forms a liquid seal therewith.

3. A resilient ring for use in grease retainers comprising a flat outer annular flange and a central annular bead and a plurality of spring fingers at its inner edge.

EMIL C. PIOCH.